April 14, 1970   W. D. HOLBEN ET AL   3,506,233

SUSPENSION TYPE ISOLATION MOUNT

Filed Feb. 16, 1968

INVENTOR.
WILBUR D. HOLBEN
ARTHUR E. REAMS
BY
Schmieding & Sultz
ATTORNEYS

United States Patent Office 3,506,233
Patented Apr. 14, 1970

3,506,233
SUSPENSION TYPE ISOLATION MOUNT
Wilbur D. Holben, Worthington, and Arthur E. Reams, Columbus, Ohio, assignors to Consolidated Kinetics Corporation, Columbus, Ohio, a corporation of Ohio
Filed Feb. 16, 1968, Ser. No. 706,025
Int. Cl. F16f 1/44, 9/00, 15/04
U.S. Cl. 248—358
8 Claims

ABSTRACT OF THE DISCLOSURE

A suspension type isolation mount characterized by an isolator pad provided with a central bore and oppositely extending connectors mounted in guided relationship in the bore of the isolator and including end portions in load transmitting relationship with load plates between which the isolator pad is sandwiched. The apparatus is so arranged to prevent metal-to-metal contact between the connectors.

---

This invention relates to apparatus for isolating vibrations and more particularly to a suspension type isolation mount for hanging ceilings or the like.

In general, the isolation mount of the present invention includes a resilient vibration isolator, formed of glass fibers, synthetic rubber, or other suitable material with the isolator being sandwiched between upper and lower load plates.

The plates and pad include aligned holes that form a vertically extending bore and upper and lower connectors are disposed in the bore, each of said connectors being mounted to a respective load plate in a unique manner such that the resilient isolator eliminates any metal to metal contact. As a result the resilient media of the isolator serves to prevent the transmission of vibrations and, in particular, the resilient media functions efficiently to interrupt the transmission of structural borne noises.

As another aspect of the present invention, the above mentioned connectors are each formed of U-shaped configuration with parallel legs and outwardly extending ends such that the legs of each connector can be disposed in the above mentioned passage through the isolation pad with the outwardly extending ends of each connector in overlying relationship with a respective one of said load plates.

It is therefore an object of the present invention to provide a suspension type isolation mount that functions efficiently to interrupt the transmission of structural-borne noises and air-borne noises which result from structural-borne noises.

It is another object of the present invention to provide a suspension type isolation mount of unique construction that can be inexpensively fabricated and assembled from a minimum of component parts.

Further objects and advantages of the present invention will be apparent from the following description, reference being had to the accompanying drawings wherein a preferred form of embodiment of the invention is clearly shown.

IN THE DRAWINGS

Figure 1:
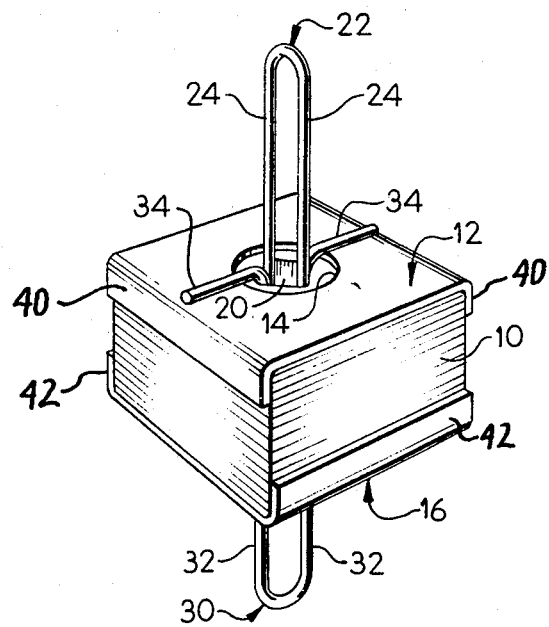
FIG. 1 is a perspective view of an isolator hanger mount constructed in accordance with the present invention.

Referring in detail to the drawings, FIG. 1 shows a suspension type isolation mount constructed according to the present invention which includes a resilient isolator 10 which may be formed of glass fibers so as to provide a pad of the type disclosed in U.S. Letters Patent 3,095,-187. If desired, isolator 10 may be formed of natural or synthetic elastomers or other suitable resilient material.

The mount further includes an upper load plate indicated generally at 12 provided with an upper plate opening 14, and lower load plate 16 provided with a lower plate opening 18.

Resilient isolator 10 is provided with a vertical passage 20 that connects the plate openings 14 and 18 with diameter of said openings being greater than the diameter of passage 20.

The mount further includes an upper connector indicated generally at 22 that includes spaced legs 24 and outwardly extending ends 26.

A lower connector indicated generally at 30 is preferably of a configuration identical to that of upper connector 22 and includes spaced legs 32 and outwardly extending ends 34.

Figure 3:
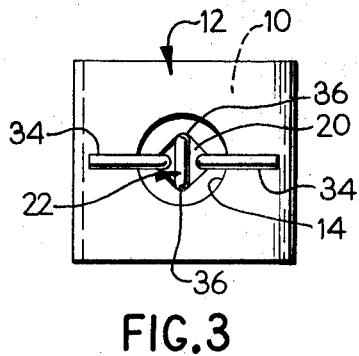
FIG. 3 is a top elevational view of the isolation hanger mount of FIG. 1.

As is best seen in FIG. 3, the inner wall of passage 20 in pad 10 is preferably formed with a square cross-sectional shape so as to provide four spaced vertically extending grooves or guides 36 for positioning legs 24 and 32 at spaced ninety degree intervals.

Figure 2:
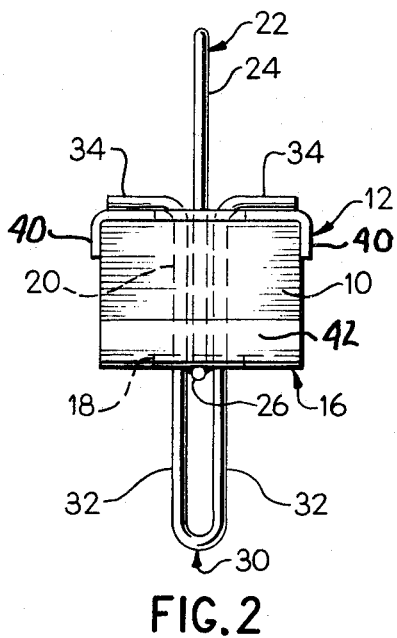
FIG. 2 is a side elevational view of the isolation hanger mount of FIG. 1.

As is best seen in FIGS. 1 and 2, load plates 12 and 16 are formed with flanged edges 40 and 42 that extend along the sides of pad 10 and thereby provide locating means that position the openings 14 and 18 so as to be concentric with passage 20 and thereby insure that each of the connectors 22 and 20 is maintained in spaced relationship with the respective load plate through which it passes.

After the components are assembled the outwardly extending ends 26 and 34 are preferably secured to their respective load plates 16 and 12 by spot welding or other suitable means.

In operation, a plurality of the individual isolation mounts are attached at spaced locations to the rough ceiling structure of a building by connecting the closed upper end of upper connectors 22 to structural members of the rough ceiling. The structural members of the suspended finished ceiling are next mounted at spaced locations to the closed lower ends of lower connector 30.

While the form of embodiment of the present invention as herein disclosed constitutes a preferred form, it is to be understood that other forms might be adopted, all coming within the scope of the claims which follows:

We claim:

1. A suspension type isolation mount comprising an upper plate including an upper opening; a lower plate including a lower opening; a resilient isolator between said upper and lower plates and including a passage connecting said openings in said plates, said passage including inwardly facing connector guides; a top connector including spaced leg portions extended through said passage and positioned by said guide surfaces in spaced relationship with said upper plate, said top connector including a lower end attached to said lower plate; and a bottom connector in spaced relationship with said lower plate and leg portions of said top connector, said botom connector including an upper end attached to said upper plate, said plates including locating means for positioning said plate openings with respect to said connector guides.

2. The isolation mount defined in claim 1 wherein said locating means are formed by edge flanges attending along sides of said isolator.

3. A suspension type isolation mount comprising an upper plate including an upper opening; a lower plate including a lower opening; a resilient isolator between said upper and lower plates and including a passage connecting said openings in said plates; a top connector extending through said passage and upper opening in spaced relationship with said upper plate, said top connector including a lower end attached to said lower plate; and a bottom connector extending through said passage and lower opening in spaced relationship with said lower plate, said bottom connector including an upper end attached to said upper plate, said passage includes an inner wall provided with spaced vertically extending grooves, said connectors being positioned in spaced relationship by said grooves.

4. A suspension type isolation mount comprising an upper plate including an upper opening; a lower plate including a lower opening; a resilient isolator between said upper and lower plates and including a passage connecting said openings in said plates; a top connector extending through said passage and upper opening in spaced relationship with said upper plate, said top connector including a lower end attached to said lower plate; and a bottom connector extending through said passage and lower opening in spaced relationship with said lower plate, said bottom connector including an upper end attached to said upper plate, said plates include edge flanges extending along sides of said isolator, said passage includes an inner wall provided with spaced vertically extending grooves, said connectors being positioned in spaced relationship by said grooves.

5. A suspension type isolation mount comprising an upper plate including an upper opening; a lower plate including a lower opening; a resilient isolator between said upper and lower plates and including a passage connecting said openings in said plates, said passage including inwardly facing connector guides; a top U-shaped connector including legs extending through said passage and positioned by said guide surfaces in spaced relationship with said upper plate, said legs including outwardly extending lower ends underlying said lower plate; and a bottom U-shaped connector including legs extending through said passage and positioned by said guide surfaces in spaced relationship with said lower plate, said legs including outwardly extending upper ends overlying said upper plate.

6. The isolation mount defined in claim 5 wherein said locating means are formed by edge flanges extending along sides of said isolator.

7. A suspension type isolation mount comprising an upper plate including an upper opening; a lower plate including a lower opening; a resilient isolator between said upper and lower plates and including a passage connecting said openings in said plates; a top U-shaped connector including legs extending through said passage and upper opening in spaced relationship with said upper plate, said legs including outwardly extending lower ends underlying said lower plate; and a bottom U-shaped connector including legs extending through said passage and lower opening in spaced relationship with said lower plate, said legs including outwardly extending upper ends overlying said upper plate, said passage includes an inner wall provided with spaced vertically extending grooves, said legs of said connectors being disposed in said grooves.

8. A suspension type isolation mount comprising an upper plate including an upper opening; a lower plate including a lower opening; a resilient isolator between said upper and lower plates and including a passage connecting said openings in said plates; a top U-shaped connector including legs extending through said passage and upper opening in spaced relationship with said upper plate, said legs including outwardly extending lower ends underlying said lower plate; and a bottom U-shaped connector including legs extending through said passage and lower opening in spaced relationship with said lower plate, said legs including outwardly extending upper ends overlying said upper plate, said plates include edge flanges extending along sides of said isolator and said passage includes an inner wall provided with spaced vertically extending grooves, said legs of said connectors being disposed in said grooves.

References Cited

UNITED STATES PATENTS

| | | | |
|---|---|---|---|
| 1,717,558 | 6/1929 | Hanson | 267—74 X |
| 1,779,663 | 10/1930 | Cowell | 267—63 X |
| 3,093,367 | 6/1963 | Hawkins | 248—358 X |

CHANCELLOR E. HARRIS, Primary Examiner

U.S. Cl. X.R.
248—343; 267—71